Patented Oct. 15, 1940

2,217,927

UNITED STATES PATENT OFFICE 2,217,927

NONAQUEOUS DRILLING FLUID

Pieter Van Campen, Oosterbeek, Netherlands, assignor to Shell Development Company, San Francisco, Calif., a corporation of Delaware No Drawing. Original application August 23, 1937, Serial No. 160,487. Divided and this application January 2, 1940, Serial No. 312,098. In the Netherlands September 5, 1936

6 Claims. (Cl. 255—1)

This invention pertains to the art of drilling wells, and relates more specifically to a process for preparing improved water-free drilling fluids comprising a nonaqueous suspending liquid, a solid suspensible material, and a peptizing agent capable of lowering the viscosity of the drilling fluid.

The present application is a division of my copending application Serial No. 160,487, filed August 23, 1937.

In drilling wells through certain formations, such, for example, as the so-called heaving shale, which swell and disintegrate on contact with water, it is often desirable to use nonaqueous drilling fluids to prevent the walls of the borehole from caving in.

Such water-free drilling fluids are commonly prepared by suspending a heavy solid material in a nonaqueous liquid.

Since, however, it is also desirable to apply a high pressure to the walls of the borehole to prevent them from collapsing when passing through a heaving shale layer, these nonaqueous drilling fluids should preferably have a relatively high specific gravity. This requires large quantities of the solid material to be suspended in the liquid medium, and results in drilling fluids of excessive viscosity, which causes considerable difficulties in drilling.

It is, therefore, the object of the present invention to provide a nonaqueous drilling fluid possessing at the same time a high specific gravity and a satisfactory viscosity, said viscosity being reduced and maintained at a low value by the use of certain peptizing agents, as described below.

It is also an object of this invention to provide a nonaqueous drilling fluid capable of effectively shutting off the walls of the borehole against the ingress of undesirable fluids, such as gases or water from porous layers.

It is a further object of this invention to minimize the fire hazard attendant the use of nonaqueous drilling fluids.

In preparing a water-free drilling fluid according to the process of the present invention, any suitable nonaqueous liquid may be used as the suspending medium, for example, crude oil, gas oil, kerosene, coal tar distillates, vegetable or animal oils, alcohols, ketones, turpentine, etc.

In order to reduce the danger of fire while at the same time increasing the specific gravity of the drilling fluid, halogenated hydrocarbons such as carbon tetrachloride, trichlor ethylene, chloro- or bromoform, etc., may be added thereto in any desired amounts, such, for example, as 15% by weight of the suspending liquids.

The solid substances which may be suspended in the above liquids to form the drilling fluid are: clay, barytes, lead compounds, such as lead oxides and sulfides, iron compounds, etc. As stated above, heavy solid substances should preferably be used to give a drilling fluid of high specific gravity. Of these, lead compounds, for example, red lead or galena, are especially suitable for the purposes of this invention, since it has been found that the viscosity of drilling fluids comprising lead compounds can be more easily reduced by the use of proper peptizing agents than that of drilling fluids comprising barytes or iron compounds, and, second, that the peptized drilling fluids comprising red lead or galena have a more satisfactory settling rate than drilling fluids comprising, for example, barytes.

Substances which promote the formation of a relatively strong and impervious sheath on the walls of the borehole, such as mica or glimmer, glass wool, sawdust, etc., may also be added to the drilling fluid to shut off the porous layers passed through. These materials need be added to the drilling fluids only in relatively small quantities: for example, the addition of 1% of ground mica gives excellent results.

As peptizing agents, that is, as agents capable of stabilizing fine solid suspensions in nonaqueous liquids while at the same time reducing the viscosity of the drilling fluids formed thereby, the following oil-soluble, but substantially water-insoluble substances may be used according to the present invention: higher carboxylic acids, such as higher fatty and naphthenic acids having at least 10 carbon atoms per molecule, and especially higher unsaturated fatty acids such as oleic, linolic, linolenic acids, etc.; oil-soluble esters of sulfuric and phosphoric acids and their salts; polymerized unsaturated hydrocarbons capable of forming polymeric homologous series, such as poly-isobutylene, poly-styrol and rubber; aliphatic and cyclic nitrogen bases, such as alkyl and arylamines, for example, cetylamine, triamylolamines, aniline, xylidine, etc.; or heterocyclic nitrogen bases such as pyridine, picoline, lutidine, quinoline, etc., or any mixtures of these substances.

It has been found that while the viscosities of nonaqueous drilling fluids can be considerably reduced by the use of any single peptizing agent selected from the above list, and especially of agents having an acid reaction, even better results may be obtained by the use of a properly selected mixture of these agents. In this regard, especially good results may be obtained by using approximately equivalent quantities of higher carboxylic acids and of amines having about equal molecular weights. These molecular weights should preferably be not greatly in excess of that of the nonaqueous suspending liquid. These mixtures, in which the acidity of the acid-reacting component (for example, oleic acid) is modified by the action of the alkaline-reacting component (for example, cetyl amine), are especially effective in treating nonaqueous drilling fluids which have been contaminated by admixture with wet shale from the formations drilled through, and whose viscosity usually cannot thereafter be reduced by treatment with a single water-insoluble acid-reacting peptizing agent. The use of these mixtures gives also most favorable results in peptizing drilling fluids comprising solid materials other than lead compounds, for example, barytes, as will be seen from the examples given below.

Summing up, the water-free drilling fluids prepared according to the method of the present invention possess the following desirable properties:

1. A high specific gravity (for example, up to 3.5 or higher) and a low viscosity, the peptizing agents used being effective in reducing drilling fluid viscosities from values above 43° to about 5° or lower by the MacMichael viscosimeter;
2. Satisfactory settling rates, not exceeding 10% of the solid material in 24 hours;
3. Resistance to gas cutting, no foam being formed in the fluid by the entry of gases from gas layers;
4. Susceptibility to repeateed treatments with the same peptizing agents even after contamination with wet shale, whereby the viscosity of the fluid may be retained at its original (treated) value by successive additions of said agents, and the same batch of drilling fluid may be used to drill through as much as 1000 feet of heaving shale even when no vibrating screen is used to remove the cuttings.

Moreover, as stated above, these drilling fluids may comprise liquid components which reduce the danger of fire, and solid components which enable them to form an impervious sheath on the walls of the borehole, thereby shutting off porous formations.

The manner in which non-aqueous drilling muds are prepared according to the present invention may be further illustrated by the following examples:

*Example I*

A suspension of red lead in gas oil, having a specific gravity of 3.5 was prepared. It formed a thick paste quite unsuitable for use as drilling fluid. The addition of 0.2 cc. of oleic acid to 100 cc. of the suspension (0.04% by weight) reduced the viscosity to 15° by the MacMichael viscosimeter, while a total addition of 0.06% by weight of oleic acid brought the viscosity down to 10° MacMichael, thus yielding a highly satisfactory drilling fluid, having a settling rate of less than 10% in 24 hours.

*Example II*

The amount of shale to be removed in drilling through 1000 feet was calculated, and an amount equivalent to this (5%) was added in dried form to the above mud, and thoroughly ground in. The viscosity of the mud increased to 25° MacMichael. The addition of a further 0.04% of oleic acid again reduced the viscosity to 10% MacMichael.

*Example III*

A barytes-kerosene drilling fluid of a specific gravity of 2.0 was prepared in the form of a thick paste. The addition of 0.08% of oleic acid was insufficient to peptize the fluid which still remained pasty. When, however, 0.08% of cetyl amine was added to this composition, it was changed to a thin fluid having a viscosity of 5° by the MacMichael viscosimeter. Since the settling rate of this fluid was too high, it was weighted with red lead to a specific gravity of 3.5, again giving a thick paste. The addition of a further quantity of 0.50% oleic acid reduced this viscosity to 16° MacMichael, and gave a satisfactory drilling fluid having a good settling rate.

*Example IV*

The drilling fluid of Example III was mixed with 5% heaving shale containing 25% water. The shale was mixed in the form of lumps of approximately ⅛" diameter, and the drilling fluid then screened. The viscosity was found to have risen from 16° to 20° MacMichael. A further treatment with oleic acid reduced this viscosity back to 16° MacMichael.

*Example V*

The drilling fluid of Example III was mixed with 5% of water-saturated heaving shale, thus approximating the worst possible drilling conditions. The viscosity of the drilling fluid rose to 30° MacMichael, and could not be reduced by treatment with oleic acid alone. A treatment with equivalent amounts of oleic acid and a mixture of cetyl and related amines, however, reduced this viscosity to 24° MacMichael.

I claim as my invention:
1. A drilling fluid comprising a mineral oil containing a dispersion of the oil-wet weighting agents, an a substance soluble in the oil base and having a sulfur-containing acid radical.
2. A drilling fluid comprising a mineral oil containing suspended lead sulfide and a quantity of a stabilizing agent possessing a sulfur-containing acid radical.
3. A drilling fluid comprising a mineral oil containing suspended lead oxide and a quantity of a stabilizing agent possessing a sulfur-containing acid radical.
4. A drilling fluid comprising a mineral oil containing a dispersion of the oil-wet weighting agent, and an oil-soluble ester of sulfuric acid.
5. A drilling fluid comprising a mineral oil containing a dispersion of the oil-wet weighting agent, and an oil-soluble salt of an ester of sulfuric acid.
6. The method of stabilizing an oil base drilling fluid containing an oil-wet weighting agent which comprises adding to the mixture a substance soluble in the oil base and having a sulfur-containing acid radical.

PIETER VAN CAMPEN.